United States Patent Office 3,505,362
Patented Apr. 7, 1970

3,505,362
ANTHRAQUINONE DYESTUFFS
Volker Hederich, Cologne-Deutz, Günter Gehrke, Cologne-Flittard, and Hans-Samuel Bien, Burscheid, Germany, assignors to Farbenfabriken Bayer Aktiengesellschaft, Leverkusen, Germany, a corporation of Germany
No Drawing. Filed Apr. 25, 1966, Ser. No. 544,807
Claims priority, application Germany, Apr. 30, 1965,
F 45,938
Int. Cl. C09b 1/50
U.S. Cl. 260—373                                    7 Claims

ABSTRACT OF THE DISCLOSURE

Anthraquinone dyestuffs useful in dyeing and printing synthetic fibers are formed by reacting an anthraquinone sulfonic acid with an aryl sulphochloride and splitting off the sulpho group from the anthraquinone nucleus.

It has been found that valuable anthraquinone dyestuffs of the Formula I

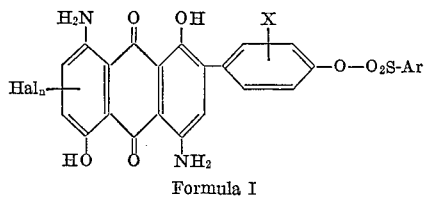

Formula I in which AR stands for an optionally substituted aryl radical, X for a hydrogen atom, lower alkyl or alkoxy groups, a chlorine or bromine atom, $n$ for 0 or 1, and Hal for a bromine or chlorine atom, can be produced in a particularly advantageous manner by reacting compounds of the Formula II

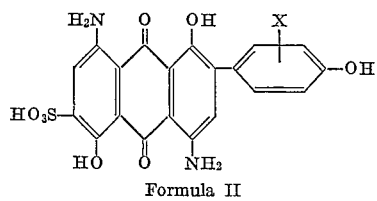

Formula II in which X has the same meaning as above, with an aryl-sulphochloride, then splitting off the sulpho group, optionally followed by halogenating the product. The reaction with the aryl-sulphochloride may be carried out in water which preferably contains 5 to 20% pyridine, at temperatures between 0 and 60° C., in the presence of acid-binding agents, such as e.g. alkali metal hydroxides or carbonates, ammonia, triethylamine or the like. The sulpho groups can then be split off in the same reaction mixture by the addition of hydrosulphite. Practically no reaction at the hydroxy or amino groups in the anthraquinone nucleus takes place if the calculated quantity of aryl-sulphochloride is used. If, however, some hydroxy or amino groups in the anthraquinone nucleus have been reacted by an excess of aryl-sulphochloride, then these are again hydrolysed during the following splitting off of the sulpho groups.

Compounds of general Formula II can be obtained by the reaction of 4,8-diamino-1,5-dihydroxy-anthraquinone-2,6-disulphonic acid with optionally substituted phenols in boro-sulphuric acid and subsequent re-arrangement, for example, according to German patent specification Nos. 445,269 and 446,563.

Suitable aryl-sulphochlorides are, e.g. benzene sulpho-chloride, toluene-sulphochloride, ethylbenezene-sulpho-chloride, chlorobenzene-sulphochloride, dichlorobenzene-sulphochloride, methoxybenzene-sulphochloride or ethoxybenzene-sulphochloride.

The splitting off of the sulpho groups can be carried out by the usual methods. The best yields are obtained by reductive splitting with, for example, hydrosulphite, glucose or zinc dust.

If the sulpho groups have already been split off from the compounds of the general Formula II before acyl-action, then the acylation is preferably carried out in pyridine or a similar organic solvent.

The halogenation can be carried out in inert organic solvents, such as nitro- or chlorobenzenes, or in sulphuric acid with the halogens themselves or halogen-yielding agents, such as e.g. sulphuryl chloride, optionally in the presence of boric acid and with the usual halogenating catalysts. In nitrobenzene the halogenation takes place in the 7-position adjacent to the amino group, in sulphuric acid in the 6-position adjacent to the hydroxy group. In comparison with the non-halogenated dyestuffs, the fastness to light, the fastness to sublimation or the evening shade are improved by the halogenation.

The dyestuffs according to the present invention are very well suited for the dyeing and printing of synthetic fibres.

It is expedient to transform the dyestuffs by the customary methods into a finely-divided state, for example, by re-precipitation from sulphuric acid, grinding or kneading in the presence of dispersing agents. In the dyeing process, the usual dyeing auxiliaries may be added. On the various fibre materials, such as those of cellulose esters, polyamides or, in particular, of polyterephthalic acid esters, the dyestuffs are empolyed by the customary dyeing methods. On cellulose-21/2-acetate, dyeing is carried out, for example, in the presence of Marseille soap at 60 to 80° C. Cellulose triacetate and polyamide fibres can by dyed at 100° C. When polyterephthalic acid ester fibres are dyed, the usual dyeing accelerators may be added or the dyeing can be carried out at 120 to 130° C. under pressure. Dyeings on polyterephthalic acid ester fibres can also be fixed by a short heat-treatment at 190 to 220° C.

On the fibres mentioned, clear blue dyeings of very good fastness to light and washing, as well as of excellent fastness to sublimation and thermofixation, are obtained. In some cases, it is advisable to use, instead of pure dyestuffs, mixtures which sometimes possess a better affinity.

In the following examples, which are given for the purpose of illustrating the present invention, the parts are parts by weight.

EXAMPLE 1

(a) 50 parts 1,5-dihydroxy-4,8-diamino-2-(4'-hydroxyphenyl)-anthraquinone-6-sulphonic acid, in the form of a 40% press cake, are suspended in 900 parts water and 100 parts technical pyridine. After the addition of 18 parts of a 47% sodium hydroxide solution, 25 parts p-tosyl chloride are dissolved in 20 parts pyridine and added at 30° C. within the course of two minutes. The reaction mixture is kept at 30 to 35° C. for 45 minutes, while stirring vigorously, buffered, if necessary, with semi-concentrated hydrochloric acid to pH 7–8 and the sulpho group split off by introducing portionwise a total of 30 to 35 parts hydrosulphite at 70° C. in the course of 6 hours. The reaction mixture is filtered off with suction while hot and washed with hot water. 45 parts 1,5-dihydroxy - 4,8 - diamino-2-(4'-p-tosyloxy-phenyl)-anthraquinone are obtained.

(b) With one part of this dyestuff, finely-divided by the customary methods, 100 parts polyester fibres in 3000 parts water are dyed for one hour at 125 to 130° C., under pressure. A full blue dyeing of very good fastness properties, especially outstanding fastness to light and sublimation, is obtained.

(c) From one part of the dyestuff prepared according to Example 1(a) and dispersed with the use of the auxiliaries customary for this purpose, 6 parts fatty alcohol sulphonate and 3000 parts water a dyebath is prepared in which 100 parts cellulose triacetate fibres are dyed for 1 hour at 100° C. A clear and full blue dying of very good fastness to washing, thremofixing and light is obtained.

EXAMPLE 2

(a) Into a mixture of 450 parts water, 50 parts technical pyridine and 10 parts of a 47% sodium hydroxide solution, there are introduced 65 parts of an aqueous 40% press cake of 1,5-dihydroxy-4,8-diamino-2-(4'-hydroxyphenyl)-anthraquinone-6-sulphonic acid. 15 parts p-chlorobenzene sulphochloride, dissolved in 10 parts pyridine, are added at 30° C. in the course of 2 minutes. After stirring for one hour at 30 to 35° C., the mixture is adjusted to a pH value of 7 to 8 by the addition of semi-concentrated hydrochloric acid. The reaction mixture is then heated to 70° C. and the sulpho group split off by the portionwise addition of 34 parts sodium hydrosulphite in the course of 4 hours. The precipitated crystals are filtered off with suction at 70° C. and washed with hot water. 46 parts 1,5-dihydroxy-4,8-diamino-2-(4'-p-chlorobenzene-sulphonyloxy-phenyl)-anthraquinone are obtained.

(b) With one part of the dyestuff prepared according to Example 2a and previously finely-divided by the usual methods, 100 parts of a polyamide fabric are dyed in 4000 parts water for one hour at 100° C. The fabric is then rinsed, first warm and then cold and dried. A clear, greenish-blue dyeing of good fastness to washing and light is obtained.

(c) A previously cleaned and thermofixed fabric of polyethylene terephthalate is printed with a paste which consists of the following components:

| | G. |
|---|---|
| Dyestuff according to Example 2(a) finely divided | 20 |
| Water | 520 |
| Crystal gum 1:2 | 450 |
| o-Cresotic acid methyl ester | 10 |

The printed and dried material is treated with hot air for 40 seconds at 200° C. to fix the dyestuffs. After soaping, rinsing and drying, a clear blue print of very good fastness to light and sublimation is obtained.

In the same manner as that described in Example 1, the dyestuffs set out in Table I are obtained which dye polyethylene terephthalate farbics in the specified shades.

TABLE I

| Example | Dyestuff | Shade |
|---|---|---|
| 3 | 1,5-dihydroxy-4,8-diamino-2-(4'-benzenesulphonyloxyphenyl)-anthraquinone. | Blue. |
| 4 | 1,5-dihydroxy-4,8-diamino-2-(4'-m-chloro-benzenesulphonyloxyphenyl)-anthraquinone. | Do. |
| 5 | 1,5-dihydroxy-4,8-diamino-2-(4'-3'',4''-dichloro-benzenesulphonyloxyphenyl)-anthraquinone. | Do. |
| 6 | 1,5-dihydroxy-4,8-diamino-2-(4'-o-tosyloxy-phenyl)-anthraquinone. | Do. |
| 7 | 1,5-dihydroxy-4,8-diamino-2-(4'-p-tosyloxy-3'-chlorophenyl)-anthraquinone. | Do. |
| 8 | 1,5-dihydroxy-4,8-diamino-2-(4'-p-tosyloxy-3'-bromophenyl)-anthraquinone. | Do. |
| 9 | 1,5-dihydroxy-4,8-diamino-2-(4'-p-tosyloxy-3',5'-dibromphenyl)-anthraquinone. | Do. |
| 10 | 1,5-dihydroxy-4,8-diamino-2-(4'-p-chlorobenzene-sulphonyloxy-3'-chlorophenyl)-anthraquinone. | Do. |
| 11 | 1,5-dihydroxy-4,8-diamino-2-(4'-p-chloro-benzenesulphonyloxy-3'-methylphenyl)-anthraquinone. | Do. |
| 12 | 1,5-dihydroxy-4,8-diamino-2-(4'-p-tosyloxy-3'-methylphenyl)-anthraquinone. | Do. |
| 13 | 1,5-dihydroxy-4,8-diamino-2-(4'-benzenesulphonyloxy-3'-ethylphenyl)-anthraquinone. | Do. |
| 14 | 1,5-dihydroxy-4,8-diamino-2-(4'-p-chloro-benzenesulphonyloxy-3'-ethoxyphenyl)-anthraquinone. | Do. |
| 15 | 1,5-dihydroxy-4,8-diamino-2-(4'-p-tosyloxy-2'-methoxyphenyl)-anthraquinone. | Do. |

EXAMPLE 16

(a) 90 parts of the dyestuff prepared according to Example 2a are introduced into a solution of 23 parts boric acid in 1500 parts 85% sulphuric acid. After the addition of 30 parts bromine and 0.2 part iodine as halogenating catalyst, the reaction mixture is stirred for 16 hours at 35 to 40° C. When no more starting material can be detected, the sulphuric acid solution is poured on to a mixture of 2000 parts ice and 50 parts of a bisulphite solution, the precipitate is filtered off with suction, the residue boiled up with water and, after washing and drying, there are obtained 100 parts 1,5-dihydroxy-4,8-diamino-6-bromo-2-(4'-p-chlorobenzene - sulphonyloxyphenyl)-anthraquinone.

(b) A fabric of polyester fibres (polyethylene terephthalate) is impregnated on a foulard with a liquor which contains, per litre, 20 g. of the dyestuff of the above constitution, previously brought into a finely-divided state, in the presence of dispersing agents. The fabric is then squeezed off to a weight increase of 70% and dried at 100° C. To fix the dyeing, the fabric is subsequently treated with hot air at 190 to 210° C. for 60 seconds, rinsed, washed with hot water and dried. A full, greenish-blue dyeing of excellent fastness to light and sublimation is obtained.

(c) With a mixture of one part of the dyestuff according to Example 16(a) and one part of the dyestuff prepared according to Example 1(a), previously brought into a finely divided state, there are dyed for 120 minutes at boiling temperature, 200 parts polyester fibres (produced by polycondensation of terephthalic acid with di-methylolcyclohexane) in 4000 parts water, in the presence of 15 parts o-cresotic acid methyl ester as carrier. The clear blue dyeing obtained is characterised by very good fastness to light and excellent fastness to sublimation.

EXAMPLE 17

(a) 10 parts of the dyestuff prepared according to Example 1(a) are heated at 130° C. for 30 minutes in 85 parts nitrobenzene, together with 7.5 parts bromine. When no more starting material can be detected in the reaction mixture, it is cooled, filtered off with suction and the residue washed with 60 parts methanol and hot water. 10.5 parts 1,5 - dihydroxy-4,8-diamino-7-bromo-2-(4'-p-tosyloxyphenyl)-anthraquinone are obtained.

(b) One part of the dyestuff obtained is finely-divided with the use of customary dispersing agents. 100 parts polyester fibres are then dyed therewith in 3000 parts water for one hour at 125 to 130° C., under pressure. A blue dyeing of very good fastness properties is obtained.

EXAMPLE 18

(a) Into a solution of 6 parts boric acid in 750 parts 85% sulphuric acid, there are introduced 20 parts 1,5-dihydroxy - 4,8 - diamino - 2 - (4' - p - chlorobenzene-sulphonyloxyphenyl) - anthraquinone and 0.2 parts iodine, as halogenating catalyst. Chlorine is then passed in at 30 to 35° C. until no more starting material can be detected. The reaction mixture is poured on to 2000 parts ice to which 50 parts of a bisulphite solution are added, the precipitate is filtered off with suction, the residue boiled up with water and dried after washing until neutral. 22 parts 1,5 - dihydroxy-4,8-diamino-6-chloro-2-(4'-p-chlorobenzene - sulphonyloxyphenyl)-anthraquinone are obtained.

(b) With one part of this dyestuff previously brought into a finely-divided state by the usual methods, 100 parts polyamide fabric are dyed in 4000 parts water for one hour at 100° C. The fabric is subsequently rinsed, first warm and then cold and dried. A clear, greenish-blue dyeing of very good fastness to light and washing is obtained.

EXAMPLE 19

(a) 5 parts 1,5-dihydroxy-4,8-diamino-2-(4'-m-chlorobenzene-sulphonyloxyphenyl)-anthraquinone are warmed to 30° C. in 70 parts anhydrous nitrobenzene in the presence of 3 parts anhydrous sodium acetate. 1.5 parts sulphuryl chloride, dissolved in 10 parts anhydrous nitrobenzene, are added dropwise within the course of 10 minutes. The temperature is maintained at 30° C. for 1 hour, the nitrobenzene driven off with steam and the dyestuff obtained then dried. 5.3 parts 1,5-dihydroxy-4,8-diamino-7-chloro-2-(4'-m-chlorobenzene-sulphonyloxyphenyl)-anthraquinone are obtained.

(b) With one part of this dyestuff, brought into a finely divided state, there are dyed 100 parts polyethylene terephthalate fibres in 3000 parts water for 1 hour at 125 to 130° C. under pressure. A greenish blue dyeing of very good fastness to light and sublimation is obtained.

The dyestuffs listed in Table II are produced in a manner analogous to that of Example 16 to 19. On polyethylene terephthalate fibres they yield the specified shades.

TABLE II

| Example | Dyestuff | Shade |
|---|---|---|
| 20 | 1,5-dihydroxy-4,8-diamino-6-bromo-2-(4'-m-chloro-benzenesulphonyloxyphenyl)-anthraquinone. | Greenish blue. |
| 21 | 1,5-dihydroxy-4,8-diamino-6-bromo-2-(4'-m,p-dichlorobenzenesulphonyloxyphenyl)-anthraquinone. | Do. |
| 22 | 1,5-dihydroxy-4,8-diamino-7-bromo-2-(4'-p-chloro-benzenesulphonyloxyphenyl)-anthraquinone. | Do. |
| 23 | 1,5-dihydroxy-4,8-diamino-7-bromo-2-(4'-benzenesulphonyloxyphenyl)-anthraquinone. | Do. |
| 24 | 1,5-dihydroxy-4,8-diamino-7-chloro-2-(4'-benzenesulphonyloxyphenyl)-anthraquinone. | Do. |
| 25 | 1,5-dihydroxy-4,8-diamino-7-bromo-2-(4'-p-tosyloxy-3'-chlorophenyl)-anthraquinone. | Do. |

The dyeing on acetate rayon may be illustrated by way of example as follows:

With a mixture of one part each of the dyestuffs according to Example 20 and Example 8, there are dyed for one hour at 75° C. 200 parts of a fabric of acetate rayon in 6000 parts water, in the presence of 10 parts Marseille soap. A greenish blue dyeing of very good fastness to light and washing is obtained.

We claim:
1. Anthraquinone dyestuffs of the formula

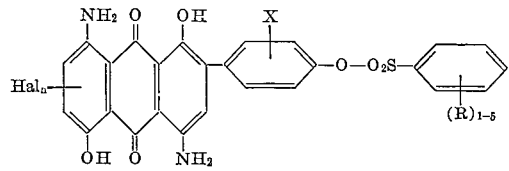

in which R is selected from the group consisting of hydrogen, halogen, lower alkyl, and lower alkoxy, X represents hydrogen, lower alkyl or alkoxy groups, a chlorine or bromine atom, Hal represents a bromine or chlorine atom, and $n$ is 0 or 1.

2. Dyestuffs of claim 1 wherein R is selected from the group consisting of hydrogen, chloro, ethyl, methoxy, and ethoxy.

3.

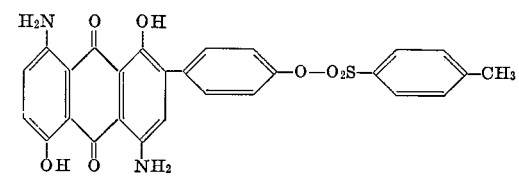

4.

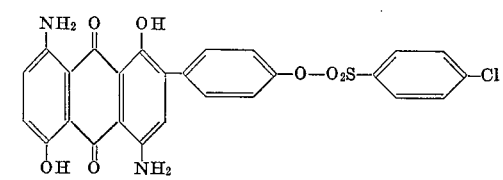

5.

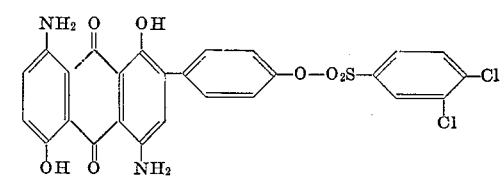

6.

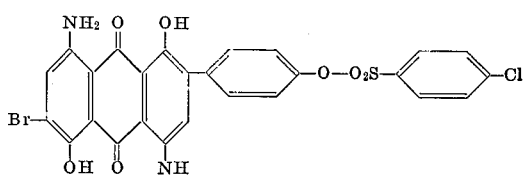

7.

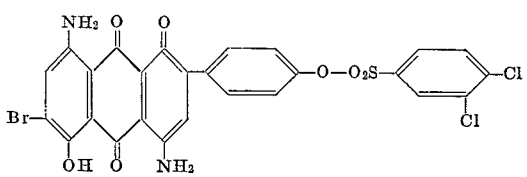

References Cited

UNITED STATES PATENTS 2,213,188  9/1940  Fleishhauer _____ 260—373
3,205,241  9/1965  Eaton et al. _____ 260—373 XR

OTHER REFERENCES

Houben: Das Anthracen und die Anthrachinone. Leipzig: Georg Thieme Verlag, pages 297–299 (1929).

LORRAINE A. WEINBERGER, Primary Examiner

H. C. WEGNER, Assistant Examiner

U.S. Cl. X.R.

8—39, 40

PO-1050
(5/69)

UNITED STATES PATENT OFFICE
CERTIFICATE OF CORRECTION

Patent No. 3,505,362      Dated April 7, 1970

Inventor(s) VOLKER HEDERICH, GUNTER GEHRKE and HANS-SAMUEL BIEN

It is certified that error appears in the above-identified patent and that said Letters Patent are hereby corrected as shown below:

Column 1, line 31, "AR" should read --Ar--.
Column 3, line 10, "thremofixing" should read --thermofixing--.

Column 6, Claim 7, " 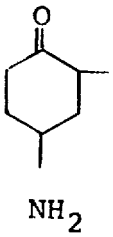 " should read -- 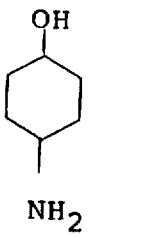 --

SIGNED AND SEALED
SE. 1-1970

(SEAL)
Attest:

Edward M. Fletcher, Jr.
Attesting Officer

WILLIAM E. SCHUYLER, JR.
Commissioner of Patents